US009728087B2

(12) United States Patent
Davis et al.

(10) Patent No.: US 9,728,087 B2
(45) Date of Patent: Aug. 8, 2017

(54) VEHICLE ACCIDENT RESPONSE USING DIAGNOSTIC DATA BURST TRANSMISSION

(71) Applicant: International Business Machines Corporation, Armonk, NY (US)

(72) Inventors: Gregory P. Davis, Wake Forest, NC (US); David B. Kumhyr, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/973,848

(22) Filed: Dec. 18, 2015

(65) Prior Publication Data
US 2017/0178513 A1 Jun. 22, 2017

(51) Int. Cl.
*G08G 1/16* (2006.01)
*H04L 29/08* (2006.01)
*H04W 4/02* (2009.01)
*H04W 4/00* (2009.01)

(52) U.S. Cl.
CPC ............ *G08G 1/162* (2013.01); *G08G 1/166* (2013.01); *H04L 67/12* (2013.01); *H04W 4/008* (2013.01); *H04W 4/023* (2013.01)

(58) Field of Classification Search
CPC ....... G08G 1/162; G08G 1/166; H04W 4/008; H04W 4/023; H04L 67/12
See application file for complete search history.

(56) References Cited

U.S. PATENT DOCUMENTS

| 9,147,353 | B1* | 9/2015 | Slusar | G09B 19/167 |
| 2006/0136291 | A1 | 6/2006 | Morita et al. | |
| 2007/0109111 | A1 | 5/2007 | Breed et al. | |
| 2011/0112969 | A1 | 5/2011 | Zaid et al. | |
| 2014/0200760 | A1 | 7/2014 | Kaufmann et al. | |
| 2015/0012152 | A1 | 1/2015 | Ricci et al. | |
| 2015/0127570 | A1* | 5/2015 | Doughty | G06Q 10/00 705/325 |

FOREIGN PATENT DOCUMENTS

| DE | 19945147 | 3/2000 |
| WO | 2013074867 | 5/2013 |
| WO | 2015026341 | 2/2015 |

OTHER PUBLICATIONS

Guo, "Vehicle Safety Communications in DSRC," IEEE, Intelligent Transportation System, 2006 US Army VI Winter Workshop, 2006, 79 pages.

(Continued)

*Primary Examiner* — Leon Flores
(74) *Attorney, Agent, or Firm* — VanLeeuwen & VanLeeuwen; David Zwick

(57) ABSTRACT

An approach is provided for vehicle accident response using diagnostic data burst transmission. In the approach, a set of vehicle data is collected during operation of a vehicle. When an impact is detected, the set of vehicle data is transmitted using a short range wireless communication technology to any receivers that are proximate to the vehicle, such as a second vehicle that was involved in the impact. The vehicle data may include intra-vehicle data, such as the vehicle identification number (VIN) of the vehicle, as well as extra-vehicle data, such as a timestamp.

20 Claims, 6 Drawing Sheets

(56) References Cited

OTHER PUBLICATIONS

Drolia et al., "Diagnostic Fusion for Time-Triggered Automotive Networks," 2012 IEEE 14th International Symposium on High-Assurance Systems Engineering (HASE), Oct. 2012, Omaha, Nebraska, pp. 1-8.
Newcomb, "FCC Ruling Could Set Connected Cars and Wi-Fi on Collision Course," Wired, Feb. 22, 2013, 10 pages.
Dockterman, "Government Wants Cars to Talk to Each Other," Time, Feb. 4, 2014, 1 page.
Lavrinc, "Feds Will Require All New Vehicles to Talk to Each Other," Wired, Feb. 3, 2014, 9 pages.
Xu et al., "Monitoring Neighboring Vehicles for Safety via V2V Communication," 2011 IEEE International Conference on Vehicular Electronics and Safety (ICVES), Jul. 2011, Beijing, China, 6 pages.

\* cited by examiner

VEHICLE ACCIDENT RESPONSE USING DIAGNOSTIC DATA BURST TRANSMISSION

BACKGROUND OF THE INVENTION

Technical Field

This disclosure relates to automatic transmission of vehicle data responsive to a sensed impact.

Description of Related Art

Vehicle on-board diagnostic, or OBD, systems provide access to the status of the various vehicle sub-systems. The amount of diagnostic information available via OBD has expanded vastly since its inception in the early 1980s. Newer OBD implementations use a standardized digital communications port to provide stored data that describes the vehicle as well as its operating status. For example mode "$09" is used to retrieve vehicle information, which includes the VIN (Vehicle Identification Number). This information is essential in describing the vehicle involved in an accident. In addition, this information may be used to automatically look up ownership information and insurance status through DMV computers as well as flag stolen status of a vehicle when such information is provided to a law enforcement computer system.

SUMMARY

An approach is provided for vehicle accident response using diagnostic data burst transmission. In the approach, a set of vehicle data is collected during operation of a vehicle. When an impact is detected, the set of vehicle data is transmitted using a short range wireless communication technology to any receivers that are proximate to the vehicle, such as a second vehicle that was involved in the impact. The vehicle data may include intra-vehicle data, such as the vehicle identification number (VIN) of the vehicle, as well as extra-vehicle data, such as a timestamp.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
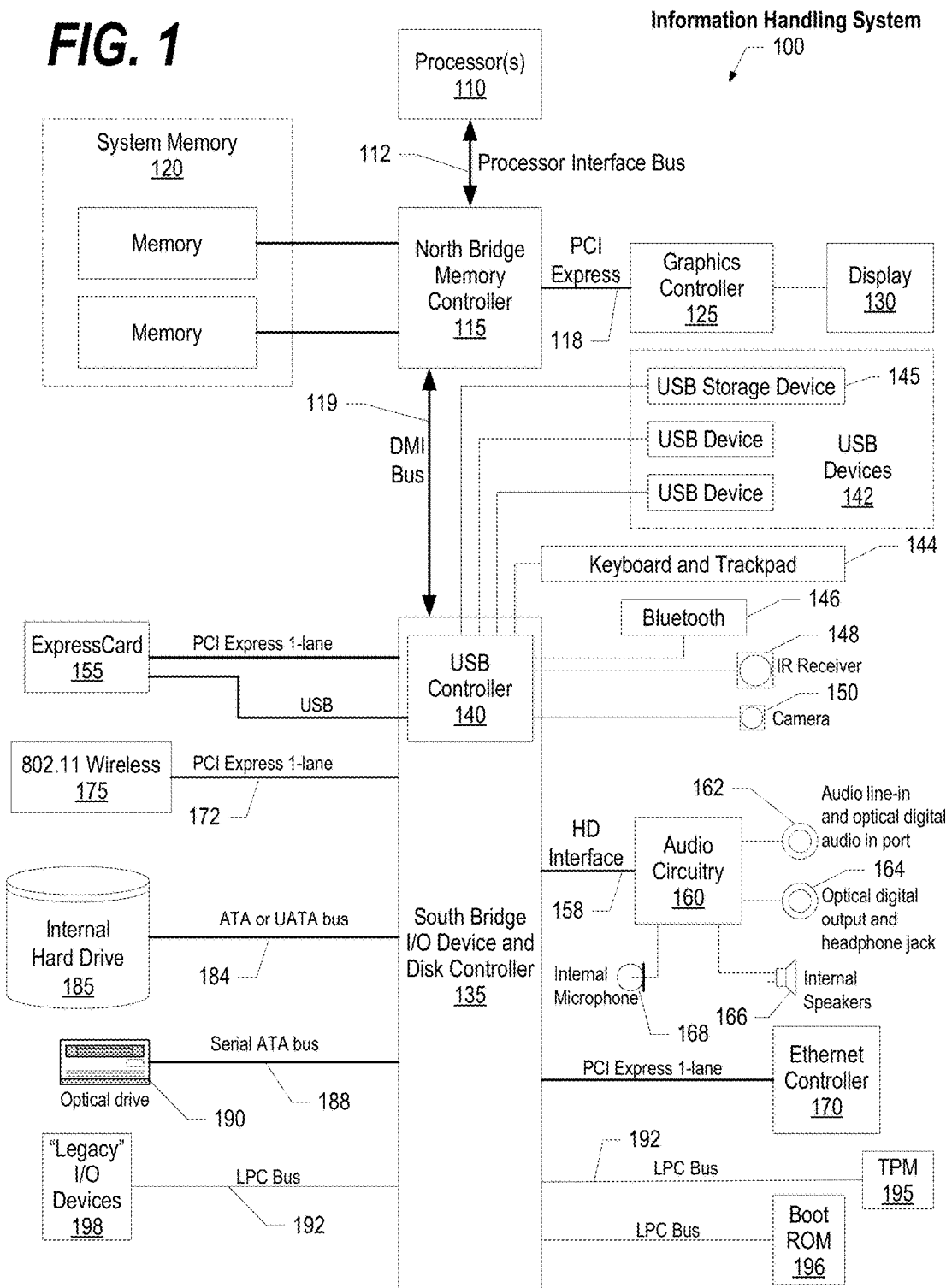
FIG. 1 depicts a block diagram of a processor and components of an information handling system.

FIGS. 1-6 describe an approach for vehicle accident response using diagnostic data burst transmission. A set of vehicle data is collected during operation of a vehicle. When an impact is detected, the set of vehicle data is transmitted using a short range wireless communication technology to any receivers that are proximate to the vehicle, such as a second vehicle that was involved in the impact. The vehicle data may include intra-vehicle data, such as the vehicle identification number (VIN) of the vehicle, as well as extra-vehicle data, such as a timestamp. The approach utilizes near field type communications, such as Near Field Communications (NFC) and Bluetooth, to provide the ability to transfer data and record, on other nearby vehicles, the VIN data or other identifying information. This information could be used to provide a starting point in identifying hit and run drivers, as well as provide other useful information pertaining to an impact or accident. This data can also be collected by law enforcement using a diagnostic unit, either wireless or by plugging into the data port of the vehicle, and downloading the data into an application that would store the raw information as evidence. Such information could supplement standard accident report data and provide a large amount of data that could be automatically generated without transcription errors of the officer at the scene of an accident.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
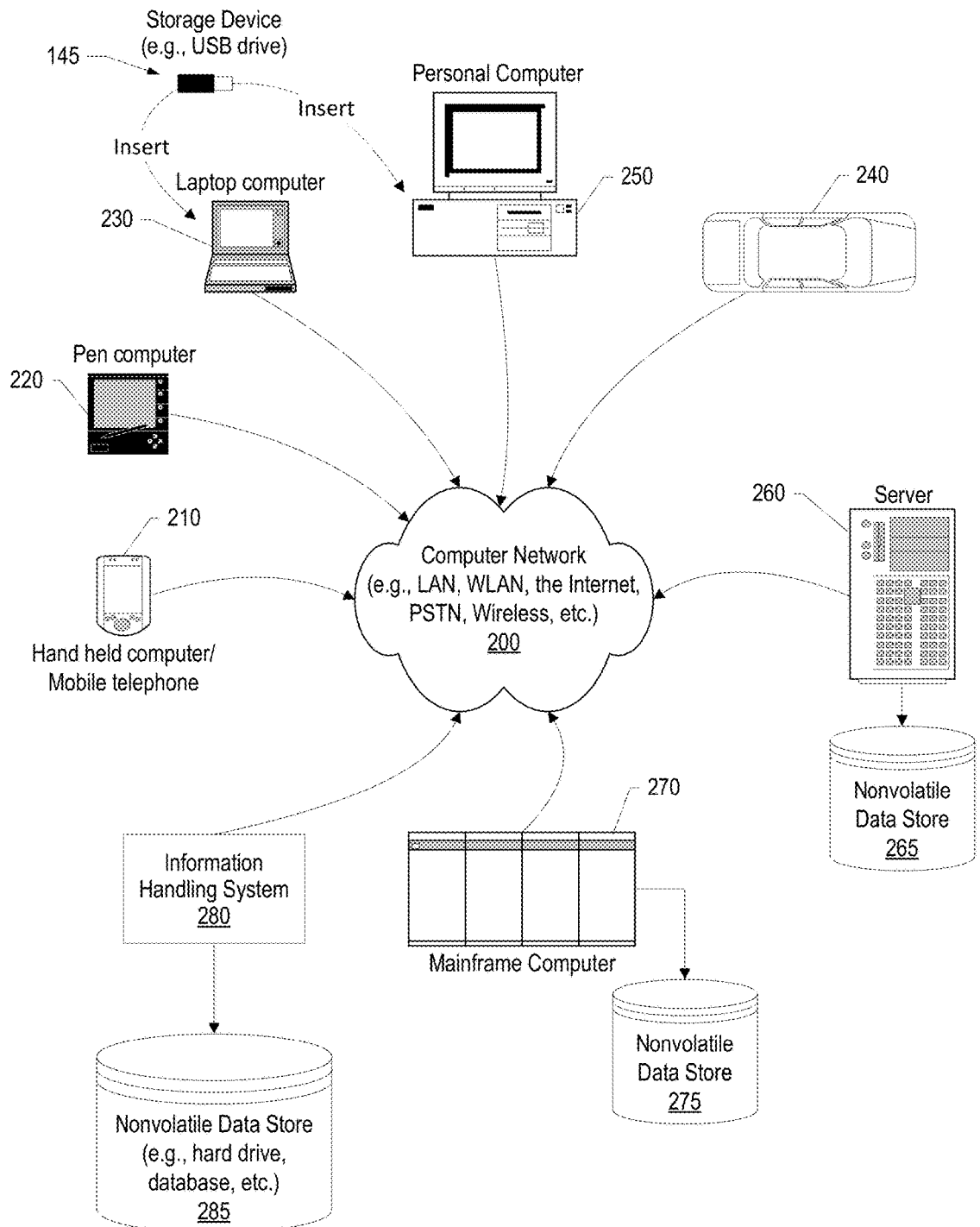
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, information handling system installed in vehicles 240, personal computer system 250, and server 260.

Vehicles 240 include short range wireless transmitters and receivers, utilizing technology such as Near Field Communication (NFC) or Bluetooth technologies. When an impact is detected, vehicles 240 transmit data pertaining to the respective vehicle at the time of the impact. In addition, vehicles proximate to an impact can receive data transmitted from vehicles involved in the impact.

Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
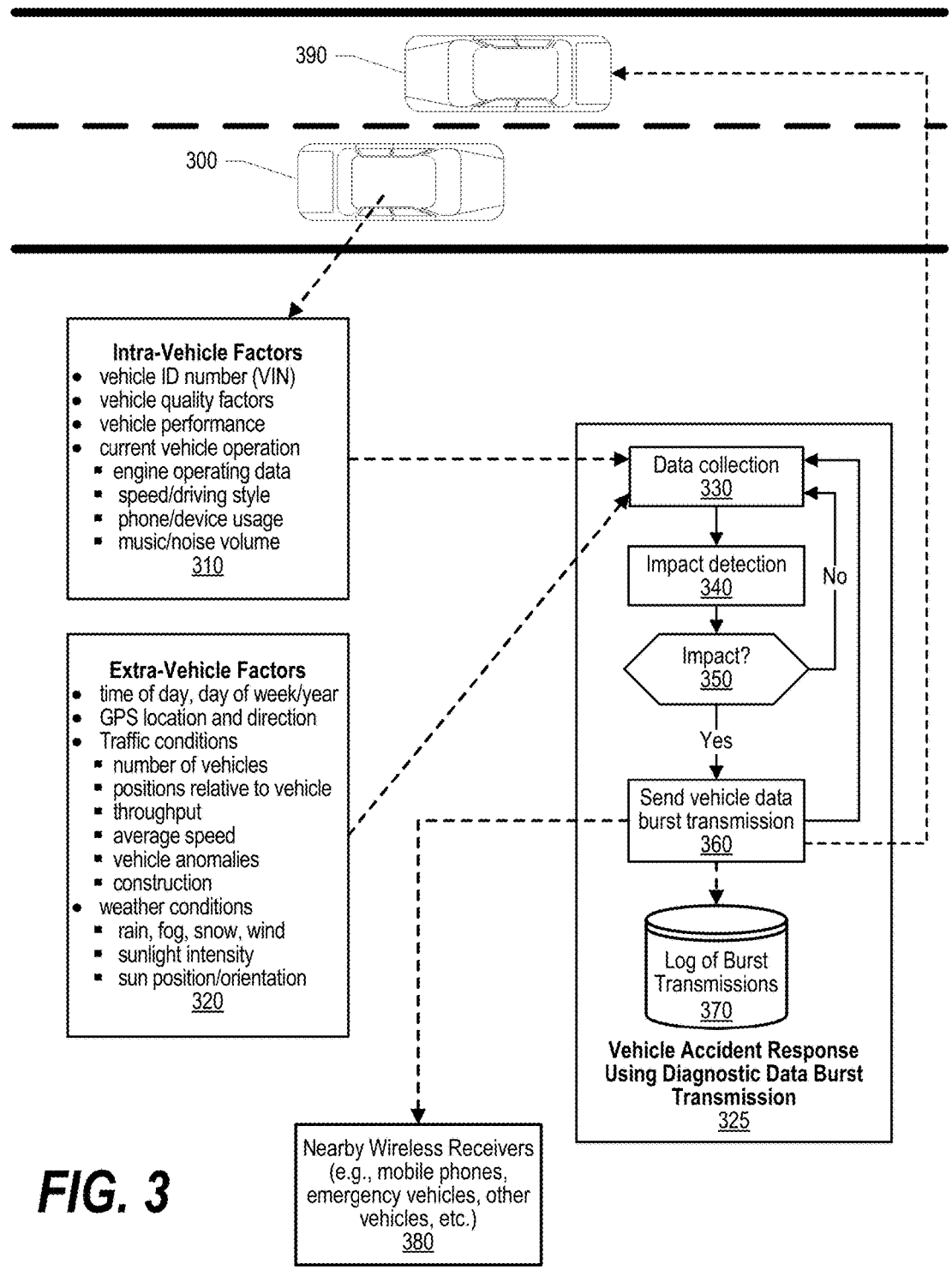
FIG. 3 is a component diagram depicting an exemplary environment providing vehicle accident response using diagnostic data burst transmission.

FIG. 3 is a component diagram depicting an exemplary environment providing vehicle accident response using diagnostic data burst transmission. First vehicles 300 and second vehicle 390 are depicted in FIG. 3. First vehicle 300 is depicted collecting a set of vehicle data during the operation of the vehicle. This data include both intra-vehicle factor data and extra-vehicle factor data.

Intra-vehicle factor data 310 can include data such as the vehicle's identification number (VIN), the vehicle's quality factors, the vehicle's performance factors, the vehicles current operation factors such as engine operating data, speed data, braking data, throttle position data, driving style data, phone or device usage data, interior music or noise volume data, and the like. Extra-vehicle factors data 320, can include the date, the time of day, the day of week/year, the GPS location data, travel direction data, traffic conditions data, number of nearby vehicles data, positions of other vehicles relative to this vehicle data, average traffic speed data, vehicle anomalies data, road construction data, weather conditions data, such as presence of rain, fog, snow, and wind, and lighting conditions data such as sunlight intensity, sun position and orientation.

First vehicle 300 executes process 325 that implements the vehicle accident response using diagnostic data burst transmission. This process is described more fully in FIGS. 4 and 5 and includes steps 330 through 360. At step 330, the process performs a data collection process that collects the intra- and extra-vehicle factors data. At step 340, the process reads sensor data to determine whether an impact has occurred at the vehicle. The process determines whether an impact has occurred (decision 350). If an impact has occurred, then decision 350 branches to the 'yes' branch to perform step 360. On the other hand, if no impact is detected, then decision 350 branches to the 'no' branch which loops back to keep collecting vehicle data.

When an impact is detected then, at step 360, the process sends vehicle data burst transmission to any nearby short range wireless receivers 380, such as receivers located in nearby mobile phones, emergency vehicles, and other vehicles. The data is sent via a short range wireless communication technology, such as Near Field Communications (NFC) technology, Bluetooth technology, etc. In one embodiment, the process also retains a copy of the transmission that was sent via the short range wireless transmission in data store 370.

Figure 4:
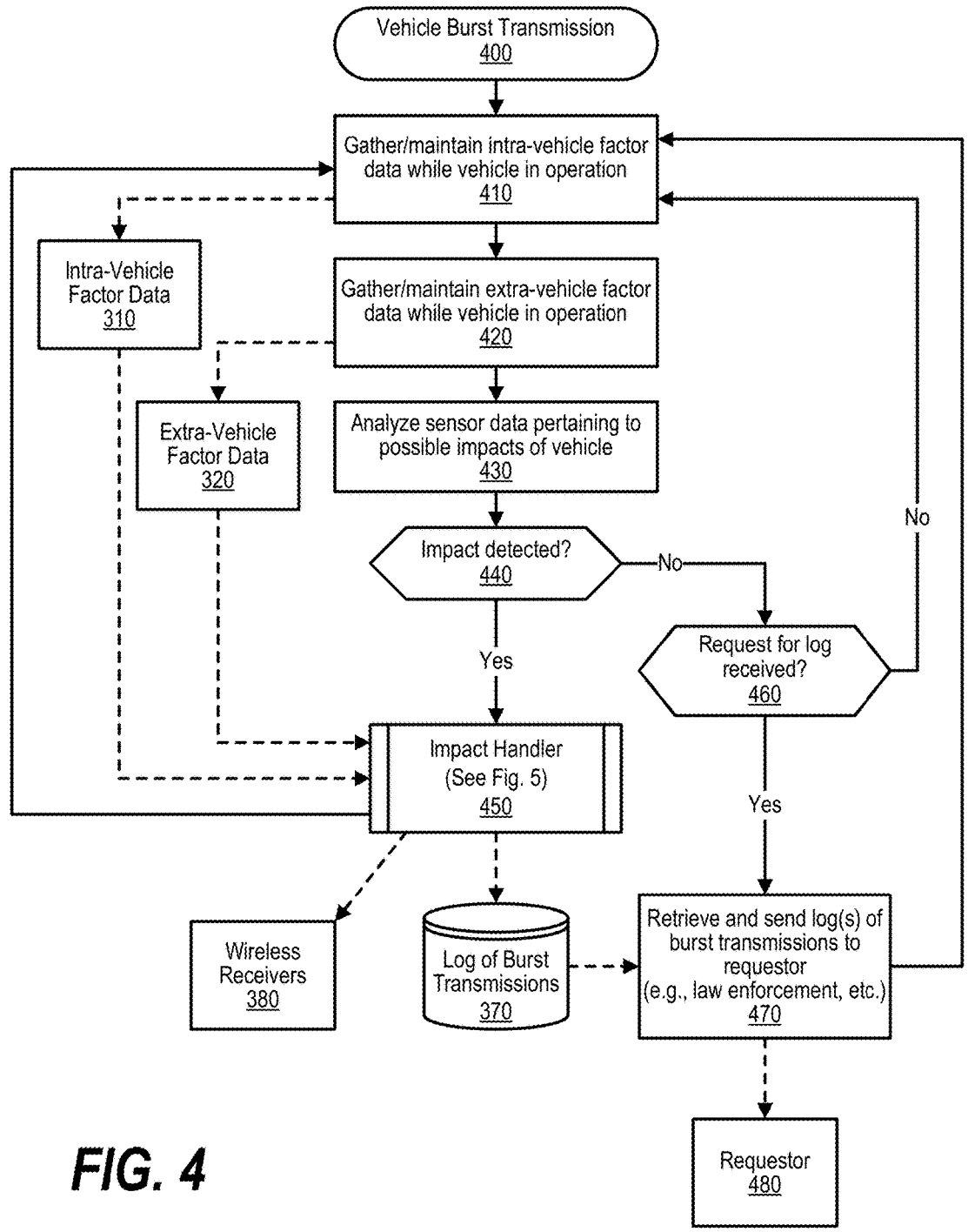
FIG. 4 is a flowchart showing overall processing performed in providing vehicle accident response using diagnostic data burst transmission.

FIG. 4 is a flowchart showing overall processing performed in providing vehicle accident response using diagnostic data burst transmission. FIG. 4 processing commences at 400 and shows the steps taken by a process that is performed by an information handling system installed in a vehicle. At step 410, the process gathers and maintains intra-vehicle factor data while the vehicle in operation. The intra-vehicle factor data is stored in data store 310. At step 420, the process gathers and maintains extra-vehicle factor data while the vehicle in operation. The extra-vehicle factor data is stored in data store 320. At step 430, the process analyzes sensor data corresponding to sensors installed on the vehicle that can detect possible impacts occurring at the vehicle. In response to analyzing the sensor data, the process determines whether an impact has been detected (decision 440). If an impact has been detected, then decision 440 branches to the 'yes' branch to perform predefined process 450. On the other hand, if an impact has not been detected, then decision 440 branches to the 'no' branch to check if a request for any impact logs stored on the vehicle have been received.

Figure 5:
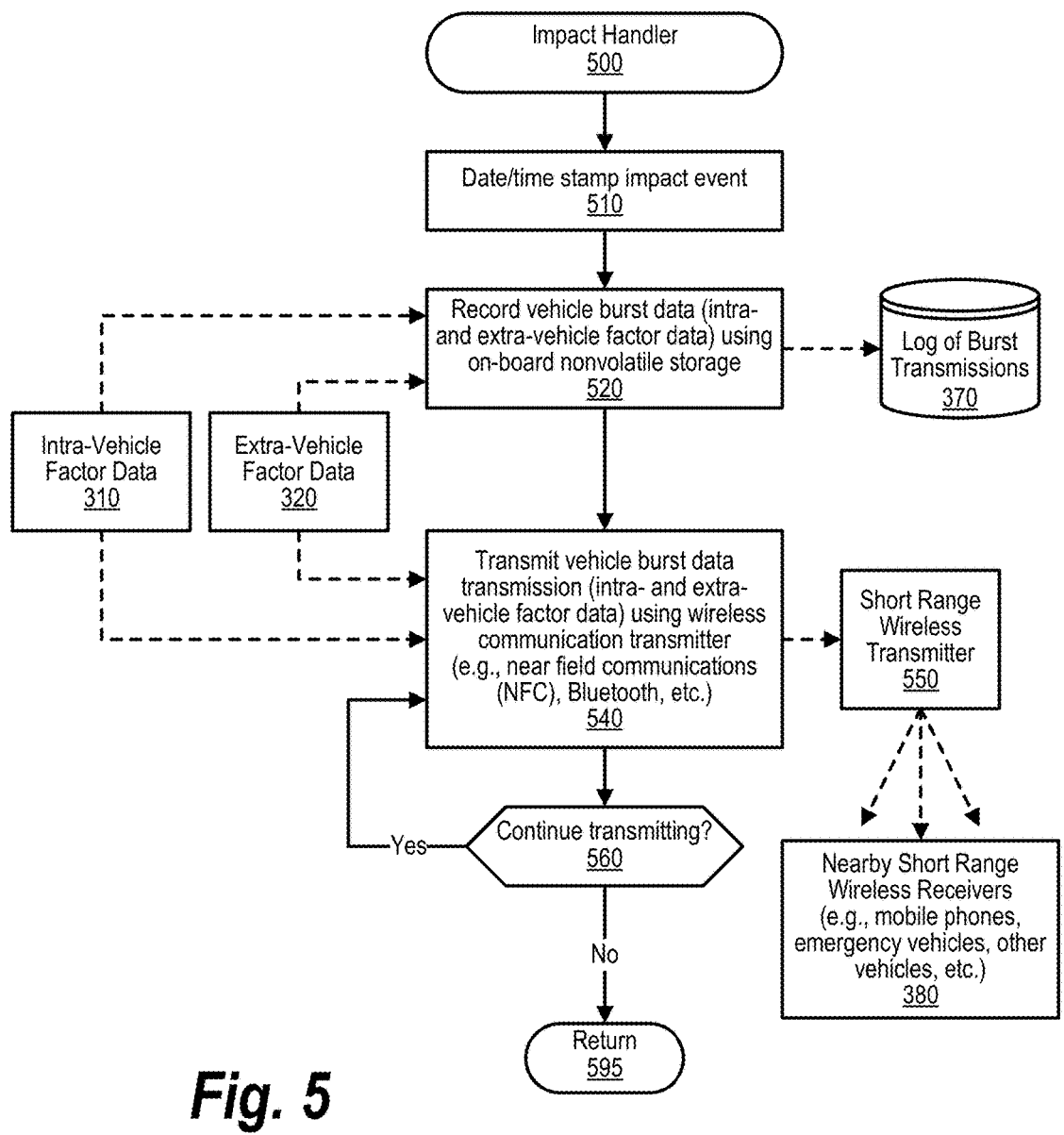
FIG. 5 is a flowchart showing steps taken by a process that is performed in response to detected impact of the vehicle.

If an impact was detected then, at predefined process 450, the process performs the Impact Handler routine (see FIG. 5 and corresponding text for processing details). Predefined process 450 transmits vehicle data to nearby wireless receivers 380 using short range wireless technology, such as Near Field Communications (NFC) technology or Bluetooth technology. In one embodiment, predefined process 450 retains a copy of the transmission in data store 370. Data store 370 can be used to store impact data generated by this vehicle as well as impact data sent by other vehicles that was received at this vehicle's short range wireless receiver. Processing then loops back to step 410 to continue gathering vehicle data and detecting future impacts at the vehicle.

Following the 'no' branch from decision 440, the process next determines whether a request for the vehicle's impact log has been received (decision 460). This request might be a wireless request or a request made by physically coupling a transmission to a physical port provided by this vehicle's information handling system. If a request for the vehicle's impact log has been received, then decision 460 branches to the 'yes' branch to perform step 470. On the other hand, if a request for the vehicle's impact log has not been received, then decision 460 branches to the 'no' branch which loops back to step 410 to continue gathering vehicle data and detecting future impacts at the vehicle. At step 470, the process retrieves and sends any logs of burst transmissions to the requestor (e.g., law enforcement, insurance provider, service provider, etc.). The data is retrieved from data store 370. As previously mentioned, data store 370 can be used to store impact data generated by this vehicle as well as impact data sent by other vehicles that was received at this vehicle's short range wireless receiver. Processing then loops back to step 410 to continue gathering vehicle data and detecting future impacts at the vehicle.

FIG. 5 is a flowchart showing steps taken a process that is performed in response to detected impact of the vehicle. FIG. 5 processing commences at 500 and shows the steps taken by a process that performs the impact handler routine. At step 510, the process generates a timestamp corresponding to the impact event. At step 520, the process records vehicle burst data (intra- and extra-vehicle factor data) onto on-board nonvolatile storage 370. The intra-vehicle factor data is retrieved from data store 310 and the extra-vehicle factor data is retrieved from data store 320. At step 540, the process transmits the vehicle burst data transmission (intra- and extra-vehicle factor data) using short range wireless communication transmitter 550 (e.g., Near Field Communications (NFC) transmitter, Bluetooth transmitter, etc.).

In one embodiment, the vehicle burst data transmission can continue for some amount of time, rather than a single transmission. In this embodiment, the process determines whether continue transmitting the vehicle burst data (decision 560). If transmission is still occurring, then decision 560 branches to the 'yes' branch which loops back to step 540 to repeat transmission of the vehicle burst data. This looping continues until such time as the transmission is halted (e.g., after a particular amount of time has transpired, etc.), at which point decision 560 branches to the 'no' branch exiting the loop. FIG. 5 processing thereafter returns to the calling routine (see FIG. 4) at 595.

Figure 6:
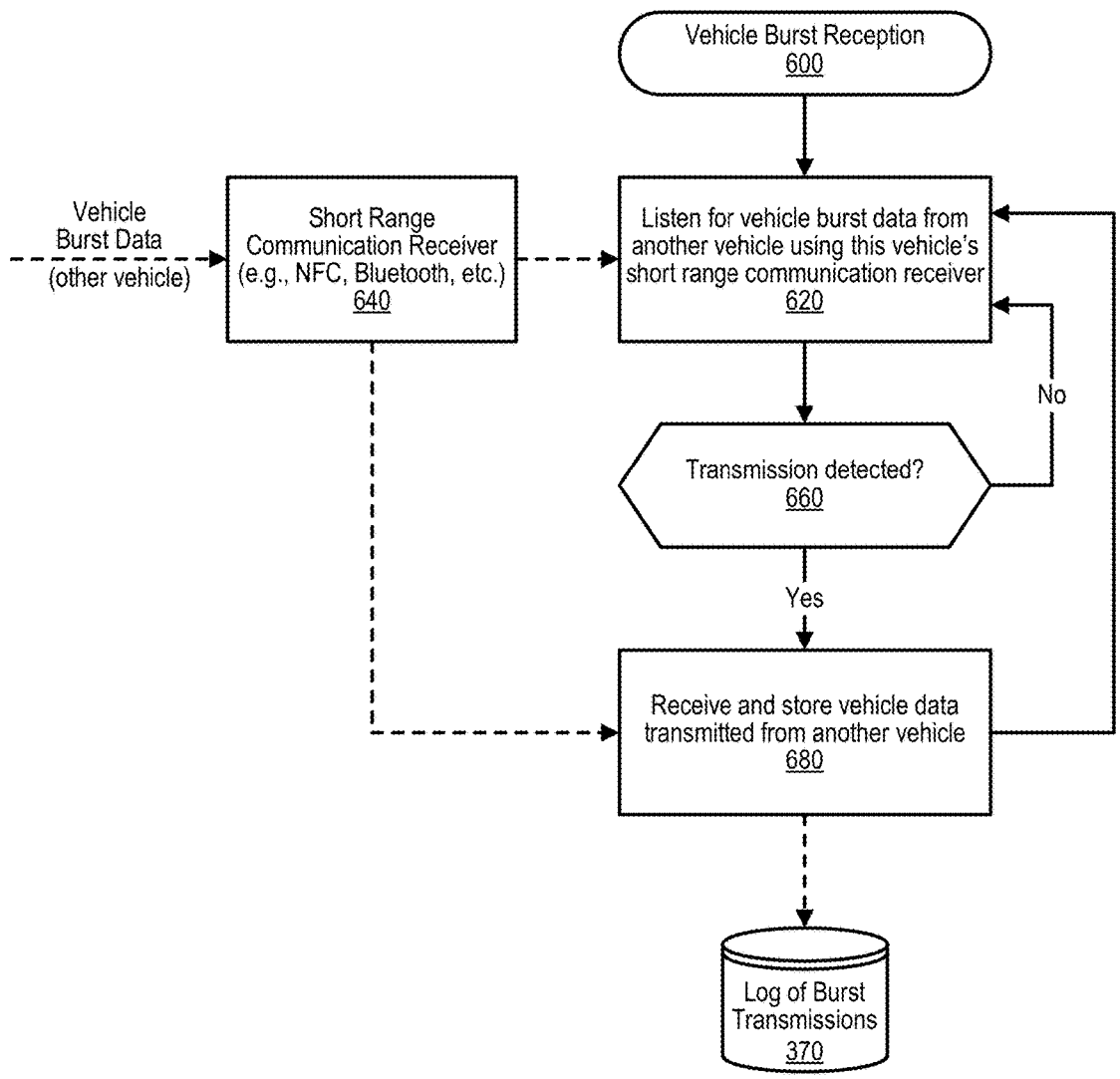
FIG. 6 is a flowchart showing steps taken by a vehicle process that receives diagnostic data burst transmissions from other vehicles.

FIG. 6 is a flowchart showing steps taken by a vehicle process that receives diagnostic data burst transmissions from other vehicles. FIG. 6 processing commences at 600 and shows the steps taken by a process that receives vehicle burst transmissions from other vehicles. The processing shown in FIG. 6 can be performed at the same time as the processing shown in FIGS. 3-5 (e.g., using a separate thread in a multitasking environment, using a separate processor/system to perform the reception activities, etc.). At step 620, the process uses this vehicle's short range communication receiver 640 (e.g., Near Field Communications (NFC) receiver, Bluetooth receiver, etc.) to listen for vehicle burst data being transmitted from another vehicle. The process determines whether a transmission has been detected from another vehicle (decision 660). If a transmission has been detected from another vehicle, then decision 660 branches to the 'yes' branch to perform step 680. On the other hand, if a transmission has not been detected from another vehicle, then decision 660 branches to the 'no' branch which loops back to step 620 to continue listening for transmissions.

When a transmission is detected then, at step 680, the process receives the vehicle data transmitted from the other vehicle using receiver 640. The data received from the other vehicle is stored in data store 370. In one embodiment, the process also determines if the data has already been received from the other vehicle, such as in the case of a repeated transmission, in which case a single transmission from the other vehicle is retained in data store 370. Processing then loops back to step 620 to continue listening for transmissions from other vehicles.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
    collecting a first set of vehicle data during operation of a first vehicle, wherein the first set of vehicle data includes one or more extra vehicle factors that include one or more weather conditions and one or more traffic conditions;
    detecting an impact at the first vehicle;
    in response to detecting the impact, transmitting the first set of vehicle data using a short range wireless communication technology to a receiver in a second vehicle, wherein the second vehicle is proximate to the first vehicle, and wherein the second vehicle is not a party to the impact;
    receiving a request, after the transmission of the first set of vehicle data, from an emergency vehicle proximate to the first vehicle to transmit the collected first set of vehicle data; and
    transmitting the first set of vehicle data to the emergency vehicle in response to the request.

2. The method of claim 1 wherein one of the receivers proximate to the first vehicle is located in a second vehicle that is proximate to the first vehicle at the time of the impact, and wherein the first set of vehicle data includes a vehicle identification number (VIN) corresponding to the first vehicle.

3. The method of claim 1 wherein the short range wireless communication technology is selected from the group consisting of Near Field Communication (NFC) technology and Bluetooth technology.

4. The method of claim 1 further comprising:
    receiving, at a wireless receiver installed in the first vehicle, a wireless burst transmission from a second vehicle that was involved in the impact, wherein the wireless burst transmission includes a second set of vehicle data that pertains to the second vehicle, and wherein the second set of vehicle data includes the vehicle identification number (VIN) of the second vehicle;
    storing the second set of vehicle data received in the wireless burst transmission in a memory included in the first vehicle; and
    storing the first set of vehicle data transmitted by the first vehicle in the memory.

5. The method of claim 4 further comprising:
    receiving, at the first vehicle, a vehicle impact request;
    retrieving the first and second sets of vehicle data from the memory; and
    outputting the first and second sets of vehicle data.

6. The method of claim 1 wherein the first set of vehicle data includes one or more intra-vehicle factors and one or more extra-vehicle factors pertaining to the first vehicle, wherein at least one of the intra-vehicle factors is selected from the group consisting of a vehicle identification number (VIN) of the first vehicle, a vehicle operation quality factor of the first vehicle, a vehicle performance factor of the first vehicle, an engine operating data of the first vehicle, speed of the first vehicle, a driving style of the first vehicle, a phone usage of the first vehicle, a braking condition of the first vehicle, a g-force occurring at the first vehicle, a throttle position of the first vehicle, and a noise volume in an interior of the first vehicle, and wherein at least one of the extra-vehicle factors is selected from the group consisting of a date, a time of day, a GPS location, a traffic condition, a number of vehicles proximate to the first vehicle, and a weather condition.

7. The method of claim 1 wherein at least one of the receivers is located in a device selected from the group consisting of a second vehicle, a law enforcement device, a fixed roadside device, an insurance device, and a service device.

8. An information handling system comprising:
    one or more processors;
    a memory coupled to at least one of the processors;
    a short range wireless transmitter accessible by at least one of the processors;
    a short range wireless receiver accessible by at least one of the processors; and
    a set of computer program instructions stored in the memory and executed by at least one of the processors in order to perform actions comprising:
        collecting a first set of vehicle data during operation of a first vehicle, wherein the first set of vehicle data includes one or more extra vehicle factors that include one or more weather conditions and one or more traffic conditions;
        detecting an impact at the first vehicle;
        in response to detecting the impact, transmitting the first set of vehicle data using a short range wireless communication technology to a receiver in a second vehicle, wherein the second vehicle is proximate to the first vehicle, and wherein the second vehicle is not a party to the impact;
        receiving a request, after the transmission of the first set of vehicle data, from an emergency vehicle proximate to the first vehicle to transmit the collected first set of vehicle data; and
        transmitting the first set of vehicle data to the emergency vehicle in response to the request.

9. The information handling system of claim 8 wherein one of the receivers proximate to the first vehicle is located in a second vehicle that is proximate to the first vehicle at the time of the impact, and wherein the first set of vehicle data includes a vehicle identification number (VIN) corresponding to the first vehicle.

10. The information handling system of claim 8 wherein the short range wireless communication technology is selected from the group consisting of Near Field Communication (NFC) technology and Bluetooth technology.

11. The information handling system of claim 8 wherein the actions further comprise:
receiving, at a wireless receiver installed in the first vehicle, a wireless burst transmission from a second vehicle that was involved in the impact, wherein the wireless burst transmission includes a second set of vehicle data that pertains to the second vehicle, and wherein the second set of vehicle data includes the vehicle identification number (VIN) of the second vehicle;
storing the second set of vehicle data received in the wireless burst transmission in a memory included in the first vehicle; and
storing the first set of vehicle data transmitted by the first vehicle in the memory.

12. The information handling system of claim 11 wherein the actions further comprise:
receiving, at the first vehicle, a vehicle impact request;
retrieving the first and second sets of vehicle data from the memory; and
outputting the first and second sets of vehicle data.

13. The information handling system of claim 8 wherein the first set of vehicle data includes one or more intra-vehicle factors and one or more extra-vehicle factors pertaining to the first vehicle, wherein at least one of the intra-vehicle factors is selected from the group consisting of a vehicle identification number (VIN) of the first vehicle, a vehicle operation quality factor of the first vehicle, a vehicle performance factor of the first vehicle, an engine operating data of the first vehicle, speed of the first vehicle, a driving style of the first vehicle, a phone usage of the first vehicle, a braking condition of the first vehicle, a g-force occurring at the first vehicle, a throttle position of the first vehicle, and a noise volume in an interior of the first vehicle, and wherein at least one of the extra-vehicle factors is selected from the group consisting of a date, a time of day, a GPS location, a traffic condition, a number of vehicles proximate to the first vehicle, and a weather condition.

14. The information handling system of claim 8 wherein at least one of the receivers is located in a device selected from the group consisting of a second vehicle, a law enforcement device, a fixed roadside device, an insurance device, and a service device.

15. A computer program product stored in a computer readable storage medium, comprising computer program code that, when executed by an information handling system, performs actions comprising:
collecting a first set of vehicle data during operation of a first vehicle, wherein the first set of vehicle data includes one or more extra vehicle factors that include one or more weather conditions and one or more traffic conditions;
detecting an impact at the first vehicle;
in response to detecting the impact, transmitting the first set of vehicle data using a short range wireless communication technology to a receiver in a second vehicle, wherein the second vehicle is proximate to the first vehicle, and wherein the second vehicle is not a party to the impact;
receiving a request, after the transmission of the first set of vehicle data, from an emergency vehicle proximate to the first vehicle to transmit the collected first set of vehicle data; and
transmitting the first set of vehicle data to the emergency vehicle in response to the request.

16. The computer program product of claim 15 wherein one of the receivers proximate to the first vehicle is located in a second vehicle that is proximate to the first vehicle at the time of the impact, and wherein the first set of vehicle data includes a vehicle identification number (VIN) corresponding to the first vehicle.

17. The computer program product of claim 15 wherein the short range wireless communication technology is selected from the group consisting of Near Field Communication (NFC) technology and Bluetooth technology.

18. The computer program product of claim 15 wherein the actions further comprise:
receiving, at a wireless receiver installed in the first vehicle, a wireless burst transmission from a second vehicle that was involved in the impact, wherein the wireless burst transmission includes a second set of vehicle data that pertains to the second vehicle, and wherein the second set of vehicle data includes the vehicle identification number (VIN) of the second vehicle;
storing the second set of vehicle data received in the wireless burst transmission in a memory included in the first vehicle; and
storing the first set of vehicle data transmitted by the first vehicle in the memory.

19. The computer program product of claim 18 wherein the actions further comprise:
receiving, at the first vehicle, a vehicle impact request;
retrieving the first and second sets of vehicle data from the memory; and
outputting the first and second sets of vehicle data.

20. The computer program product of claim 15 wherein the first set of vehicle data includes one or more intra-vehicle factors and one or more extra-vehicle factors pertaining to the first vehicle, wherein at least one of the intra-vehicle factors is selected from the group consisting of a vehicle identification number (VIN) of the first vehicle, a vehicle operation quality factor of the first vehicle, a vehicle performance factor of the first vehicle, an engine operating data of the first vehicle, speed of the first vehicle, a driving style of the first vehicle, a phone usage of the first vehicle, a braking condition of the first vehicle, a g-force occurring at the first vehicle, a throttle position of the first vehicle, and a noise volume in an interior of the first vehicle, and wherein at least one of the extra-vehicle factors is selected from the group consisting of a date, a time of day, a GPS location, a traffic condition, a number of vehicles proximate to the first vehicle, and a weather condition.

* * * * *